US012458296B2

(12) United States Patent
Omura

(10) Patent No.: US 12,458,296 B2
(45) Date of Patent: Nov. 4, 2025

(54) ELECTRONIC DEVICE, INFORMATION OUTPUT METHOD, AND NON-TRANSITORY RECORDING MEDIUM

(71) Applicant: CASIO COMPUTER CO., LTD., Tokyo (JP)

(72) Inventor: Tatsuyoshi Omura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 620 days.

(21) Appl. No.: 17/882,059

(22) Filed: Aug. 5, 2022

(65) Prior Publication Data
US 2023/0080792 A1 Mar. 16, 2023

(30) Foreign Application Priority Data

Sep. 13, 2021 (JP) ................. 2021-148349

(51) Int. Cl.
*A61B 5/00* (2006.01)
*A61B 5/024* (2006.01)

(52) U.S. Cl.
CPC ........ *A61B 5/7221* (2013.01); *A61B 5/02438* (2013.01); *A61B 5/681* (2013.01); *A61B 5/743* (2013.01); *A61B 5/7455* (2013.01)

(58) Field of Classification Search
CPC ... A61B 5/7221; A61B 5/02438; A61B 5/681; A61B 5/743; A61B 5/7455; A61B 5/486; A61B 2560/0242; A61B 5/742; A61B 5/6843
See application file for complete search history.

(56) References Cited

U.S. PATENT DOCUMENTS

2016/0252883 A1* 9/2016 Inoue .................. G04B 47/066
368/11
2020/0245875 A1* 8/2020 Hayami ............... A61B 5/0245

FOREIGN PATENT DOCUMENTS

| EP | 3646781 A1 * | 5/2020 | ......... A61B 5/02405 |
|---|---|---|---|
| JP | S62274288 A | 11/1987 | |
| JP | 2012161556 A | 8/2012 | |
| JP | 2016120065 A | 7/2016 | |
| JP | 2017191028 A | 10/2017 | |
| JP | 2021-041088 A | 3/2021 | |
| JP | 2021069615 A | 5/2021 | |
| WO | 2019003549 A1 | 1/2019 | |

OTHER PUBLICATIONS

Office Action dated Aug. 13, 2024 received in Chinese Patent Application No. 202211111302.7.
Notice of Reasons for Refusal dated Jul. 18, 2023 received in Japanese Patent Application No. JP 2021-148349.

* cited by examiner

*Primary Examiner* — Michael W Kahelin
*Assistant Examiner* — Sebastian X Lukjan
(74) *Attorney, Agent, or Firm* — Scully, Scott, Murphy & Presser, P.C.

(57) ABSTRACT

An electronic device includes a first outputter and a processor. The processor is configured to acquire biometric information that is information about a living body, calculate a reliability of the biometric information based on the acquired biometric information, and output the biometric information to the first outputter in an output mode associated with the calculated reliability.

20 Claims, 13 Drawing Sheets

FIG. 13

| ACQUISITION ACCURACY | POOR | NORMAL | GOOD |
|---|---|---|---|
| RELIABILITY INDEX | 1 | 2 | 3 |
| PULSE RATE DISPLAY METHOD | | | |
| NUMERICAL VALUE | NO DISPLAY | DISPLAY | DISPLAY |
| | DISPLAY SMALL | DISPLAY NORMALLY | DISPLAY LARGE |
| | DISPLAY LIGHTLY | DISPLAY NORMALLY | DISPLAY DARKLY |
| | DISPLAY IN RED | DISPLAY IN BLACK | DISPLAY IN BLUE |
| | DIFFICULT TO READ FONT | NORMAL FONT | EASY TO READ FONT |
| POINTER | LARGE VIBRATION | SMALL VIBRATION | NO VIBRATION |
| GRAPH | NOT PLOTTED | PLOTTED | PLOTTED |
| | WIDELY SPACED DOTTED LINE | NARROWLY SPACED DOTTED LINE | SOLID LINE |
| | THIN LINE WIDTH | NORMAL LINE WIDTH | THICK LINE WIDTH |
| | PLOTTED IN RED | PLOTTED IN BLACK | PLOTTED IN BLUE |
| OPTIONAL | LIGHT ONE RELIABILITY MARK | LIGHT TWO RELIABILITY MARKS | LIGHT THREE RELIABILITY MARKS |
| | POINTER POINTS TO 1 | POINTER POINTS TO 2 | POINTER POINTS TO 3 |
| | SECOND HAND POINTS TO SIX O'CLOCK | SECOND HAND POINTS TO THREE O'CLOCK | SECOND HAND POINTS TO TWELVE O'CLOCK |

FIG. 14

| ACQUISITION ACCURACY | POOR | NORMAL | GOOD |
|---|---|---|---|
| RELIABILITY INDEX | 1 | 2 | 3 |
| VIBRATION FREQUENCY | 3Hz | 3Hz | 0 |
| SWING WIDTH WITH RESPECT TO POINTER | ±2 | ±1 | 0 |

ELECTRONIC DEVICE, INFORMATION OUTPUT METHOD, AND NON-TRANSITORY RECORDING MEDIUM

CROSS-REFERENCE TO RELATED APPLICATION

This application claims the benefit of Japanese Patent Application No. 2021-148349, filed on Sep. 13, 2021, the entire disclosure of which is incorporated by reference herein.

FIELD

The present disclosure relates generally to an electronic device, an information output method, and a non-transitory recording medium.

BACKGROUND

In recent years, in the field of electronic devices such as wristwatches worn on the body, electronic devices have been developed that are capable of measuring biometric information such as a pulse rate using sensors such as an optical sensor. While such electronic devices make it possible to easily measure the biometric information of a user (wearer), reliability of the measured biometric information may decrease depending on how the electronic device is used. For example, the reliability may decrease when the electronic device is not securely worn on the arm of the user. When the reliability of the biometric information is low, there is a possibility that large errors may occur and, when such information including large errors is displayed, the user may be caused unnecessary anxiety. Accordingly, when displaying information for which the reliability may be high or low, it is desirable to that the reliability of that information is ascertainable. For example, Unexamined Japanese Patent Application Publication No. 2021-41088 describes an electronic device and a method in which, when displaying biometric information, reliability of that biometric information can also be displayed.

SUMMARY

An electronic device according to one aspect of the present disclosure includes a first outputter and a processor. The processor is configured to acquire biometric information that is information about a living body, calculate a reliability of the biometric information based on the acquired biometric information, and output the biometric information to the first outputter in an output mode associated with the calculated reliability.

An information output method for an electronic device according to another aspect of the present disclosure including a first outputter and a processor includes acquiring, by the processor, biometric information that is information about a living body, calculating, by the processor, a reliability of the biometric information based on the acquired biometric information, and outputting, by the processor, the biometric information to the first outputter in an output mode associated with the calculated reliability.

A non-transitory computer-readable recording medium according to still another aspect of the present disclosure is a non-transitory computer-readable recording medium storing a program, the program causing a computer of an electronic device including a first outputter and a processor to execute the following processing of acquiring biometric information that is information about a living body, calculating a reliability of the biometric information based on the acquired biometric information; and outputting the biometric information to the first outputter in an output mode associated with the calculated reliability.

BRIEF DESCRIPTION OF THE DRAWINGS

A more complete understanding of this application can be obtained when the following detailed description is considered in conjunction with the following drawings, in which:

FIG. 13 is a table illustrating an example of various output modes for displaying the pulse rate;

FIG. 14 is a table illustrating an example of magnitudes of vibration when displaying the pulse rate with a pointer;

DETAILED DESCRIPTION

Figure 1:
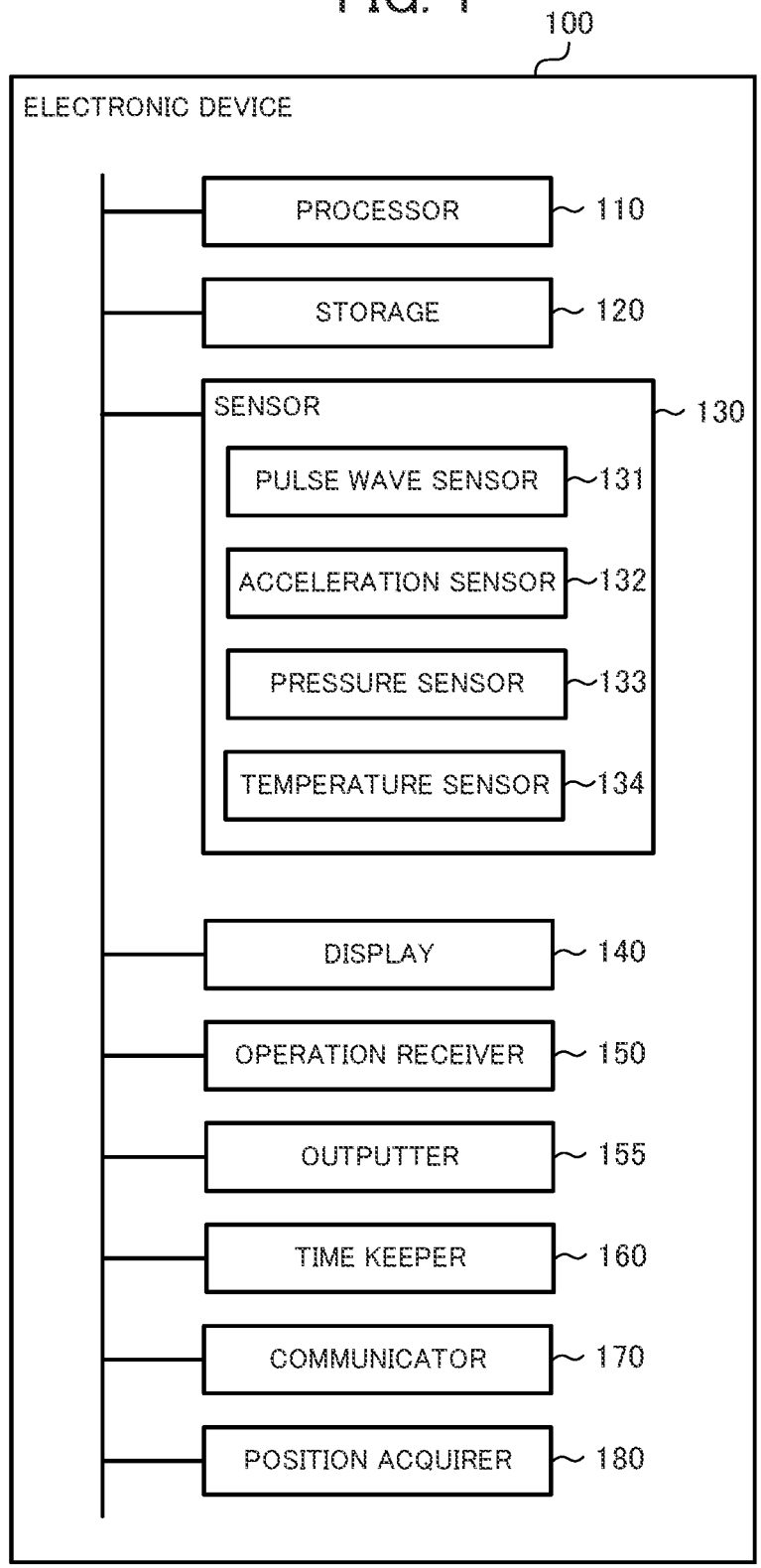
FIG. 1 is a block diagram illustrating an example of the functional configuration of an electronic device according to an embodiment.

Hereinafter, an electronic device and the like according to various embodiments are described while referencing the drawings. Note that, in the drawings, identical or corresponding components are denoted with the same reference numerals.

Embodiments

An electronic device according to an embodiment is a wristwatch type device such as, for example, a smart watch.

This electronic device is capable of measuring a pulse rate of a user by the user wearing the electronic device on a wrist.

Figure 6:
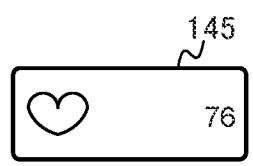
FIG. 6 is a drawing illustrating a third example in which a pulse rate is displayed on the pulse rate display in an output mode corresponding to the reliability of the pulse rate.

In Unexamined Japanese Patent Application Publication No. 2021-41088, as illustrated in FIG. 6 thereof, biometric information and reliability are displayed in separate columns and, consequently, a user cannot ascertain the reliability of the biometric information by viewing the biometric information column alone, and the user must also view the reliability column in order to ascertain the reliability.

The present disclosure is made with the view of the above situation, and an objective of the present disclosure is to provide an electronic device, an information output method, and a non-transitory recording medium capable of outputting biometric information in an output mode whereby a user can ascertain the reliability of that biometric information at the same time the user ascertains that biometric information.

As illustrated in FIG. 1, the electronic device 100 according to this embodiment includes a processor 110, a storage 120, a sensor 130, a display 140, an operation receiver 150, and outputter 155, a timekeeper 160, a communicator 170, and a position acquirer 180.

In one example, the processor 110 is configured from a processor such as a central processing unit (CPU) or the like. The processor 110 executes, by a program stored in the storage 120, hereinafter described pulse rate display processing and the like. Additionally, the processor 110 is compatible with multithreading processing, and can execute a plurality of processes in parallel.

The storage 120 stores the program to be executed by the processor 110 and necessary data. The storage 120 may include random access memory (RAM), read-only memory (ROM), flash memory, or the like, but is not limited thereto. Note that the storage 120 may be provided inside the processor 110.

The sensor 130 includes a pulse wave sensor 131, an acceleration sensor 132, a pressure sensor 133, and a temperature sensor 134. However, the sensor 130 may include other sensors provided that at least one each of a sensor that constitutes a first detector for detecting biometric information (for example, the pulse wave sensor 131) and a sensor that constitutes a second detector for detecting information other than the biometric information (for example, the pressure sensor 133) are provided. Additionally, the sensor 130 may include a sensor other than the pulse wave sensor 131, the acceleration sensor 132, the pressure sensor 133, and the temperature sensor 134.

The pulse wave sensor 131 includes a light emitting diode (LED) and a photodiode (PD). Light emitted toward a living body from the LED reflects within the living body, and the reflected light is received by the PD. The pulse wave sensor 131 detects a pulse wave on the basis of temporal changes of the received light intensity. The processor 110 acquires, as a biodetection value, a value (AD value) obtained by AD-converting the received light intensity at the PD using an analog-to-digital (AD) converter, and calculates a pulse rate on the basis of temporal changes of the AD value. Note that the pulse wave sensor 131 may include an analog front end (AFE). Even when the received light intensity (analog signal) at the PD is weak and cannot be AD-converted as-is, AD conversion can be carried out by adjusting the analog signal using the APE. Additionally, since a pulse rate and a heart rate basically coincide with each other, both a pulse rate and a heart rate are referred to as a pulse rate in the following description.

The acceleration sensor 132 is implemented as a three-axis acceleration sensor that detects motion in three axial directions that are orthogonal to each other. For example, when the user wearing the electronic device 100 moves, the processor 110 can acquire, from the acceleration sensor 132, which direction and with how much acceleration the user moves.

The pressure sensor 133 measures pressure of the wearing of the electronic device 100 on the arm. In one example, when the user wears the electronic device 100 tightly on the arm, the pressure sensor 133 detects high pressure, and when the user wears the electronic device 100 loosely on the arm, the pressure sensor 133 detects low pressure.

In one example, the temperature sensor 134 includes a thermistor and a resistance temperature detector, and measures the air temperature around the electronic device 100.

The display 140 includes a display device such as a physical hand, a liquid crystal display, an organic electro-luminescence (EL) display, or the like. The display 140 displays the pulse rate measured by the pulse wave sensor 131, time measured by the timekeeper 160, and the like. Note that the display 140 may include an analog time display configured from physical hands (second hand, minute hand, hour hand), a date wheel and a motor driver, and a motor and wheel train mechanism. Additionally, instead of by the physical analog time display, the display 140 may carry out analog time display by displaying an image of hands on a display device such as a liquid crystal display or the like.

The operation receiver 150 is a user interface such as a crown, a push button switch, or the like, and receives operations/inputs from the user. The processor 110 can acquire, on the basis of a detection result such as a rotation of the crown or a pressed state of the switch of the operation receiver 150, the type of operation/input performed by the user. Note that, when the electronic device 100 includes a touch panel that is integrated with the display 140, the touch panel also serves as the operation receiver 150 and receives tap operations and the like of the user.

The outputter 155 includes a speaker and outputs voice announcements and sound effects. Note that, instead of or in addition to the speaker, the electronic device 100 may include, as the outputter 155, an LED (light emitter) and/or a vibrator.

The timekeeper 160 measures a time that the electronic device 100 displays on the display 140. Additionally, the timekeeper 160 has a function of a timer that measures a specified amount of time. Note that the timekeeper 160 may be configured from software that changes a value stored at a predetermined address in the storage 120 every predetermined amount of time (for example, one second), or may be configured from dedicated hardware. Moreover, the timekeeper 160 may be provided inside the processor 110.

The communicator 170 is a communication interface whereby the electronic device 100 carries out data communication with an external device (for example, a smartphone, a tablet computer, a personal computer (PC), another smart watch, or the like), acquires information from the internet, and the like. The communicator 170 can include a wireless communication interface for communicating by Bluetooth (registered trademark) or a wireless local area network (LAN), for example, but is not limited thereto.

The position acquirer 180 receives a satellite signal sent from a global positioning system (GPS) satellite to acquire a current position of the electronic device 100. The position acquirer 180 cannot receive the satellite signal indoors and, as such, the processor 110 can determine whether the current position is outdoors or indoors on the basis of whether the position acquirer 180 can receive the satellite signal.

Figure 2:
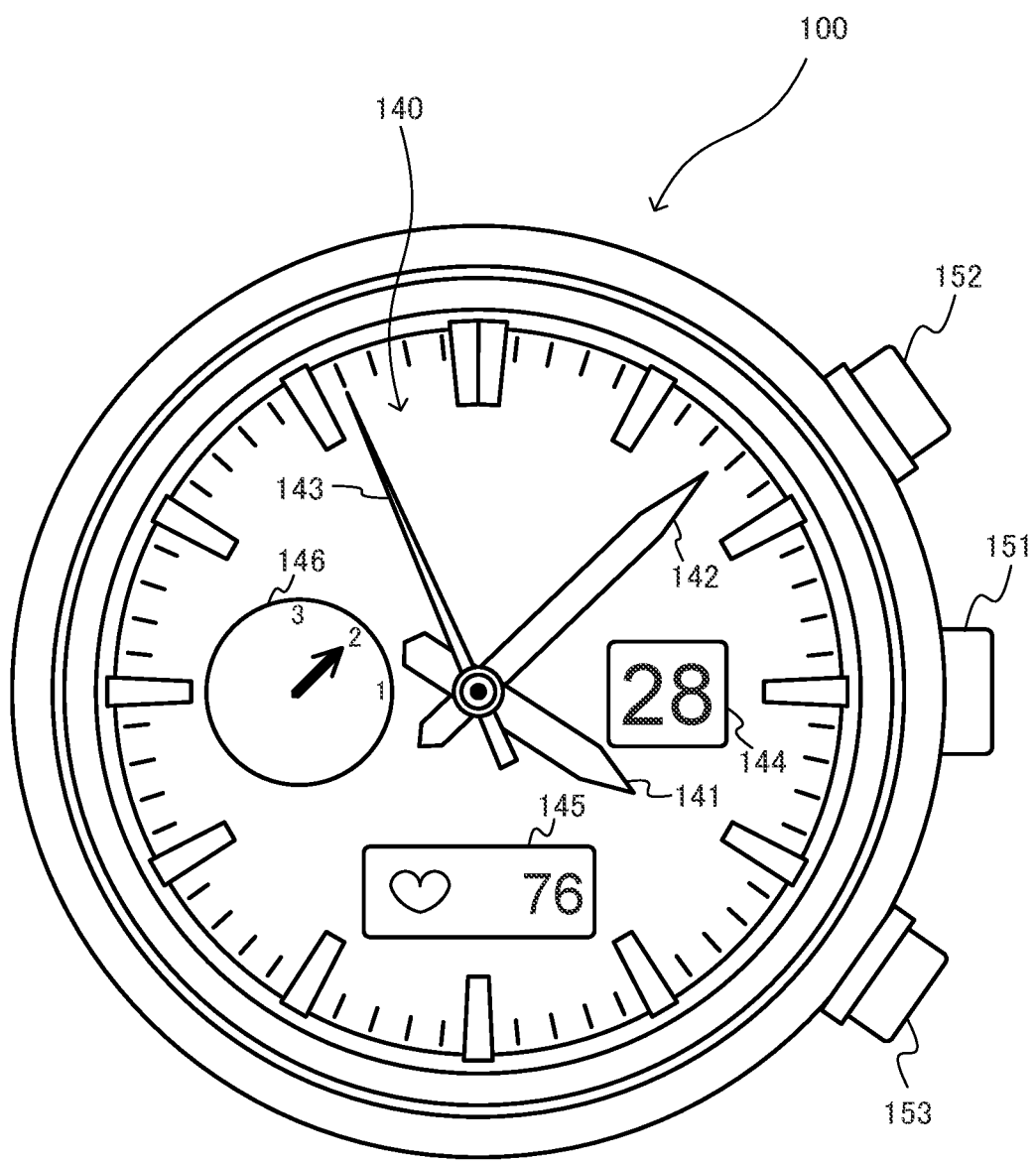
FIG. 2 is a drawing illustrating an example of the appearance of the electronic device from a front side.

As illustrated in FIG. 2, in terms of appearance, the electronic device 100 includes, on the front side and as the display 140, an hour hand 141, a minute hand 142, a second hand 143, a date wheel 144, a pulse rate display 145, and a small hand display 146. The electronic device 100 displays the time by the hour hand 141, the minute hand 142, and the second hand 143; the date by the date wheel 144; and the pulse rate of the user by the pulse rate display 145. Additionally, the small hand display 146 is capable of displaying various types of information in accordance with the functions of the electronic device 100. In one example, the small hand display 146 displays the reliability of the pulse rate being displayed by the pulse rate display 145.

Figure 3:
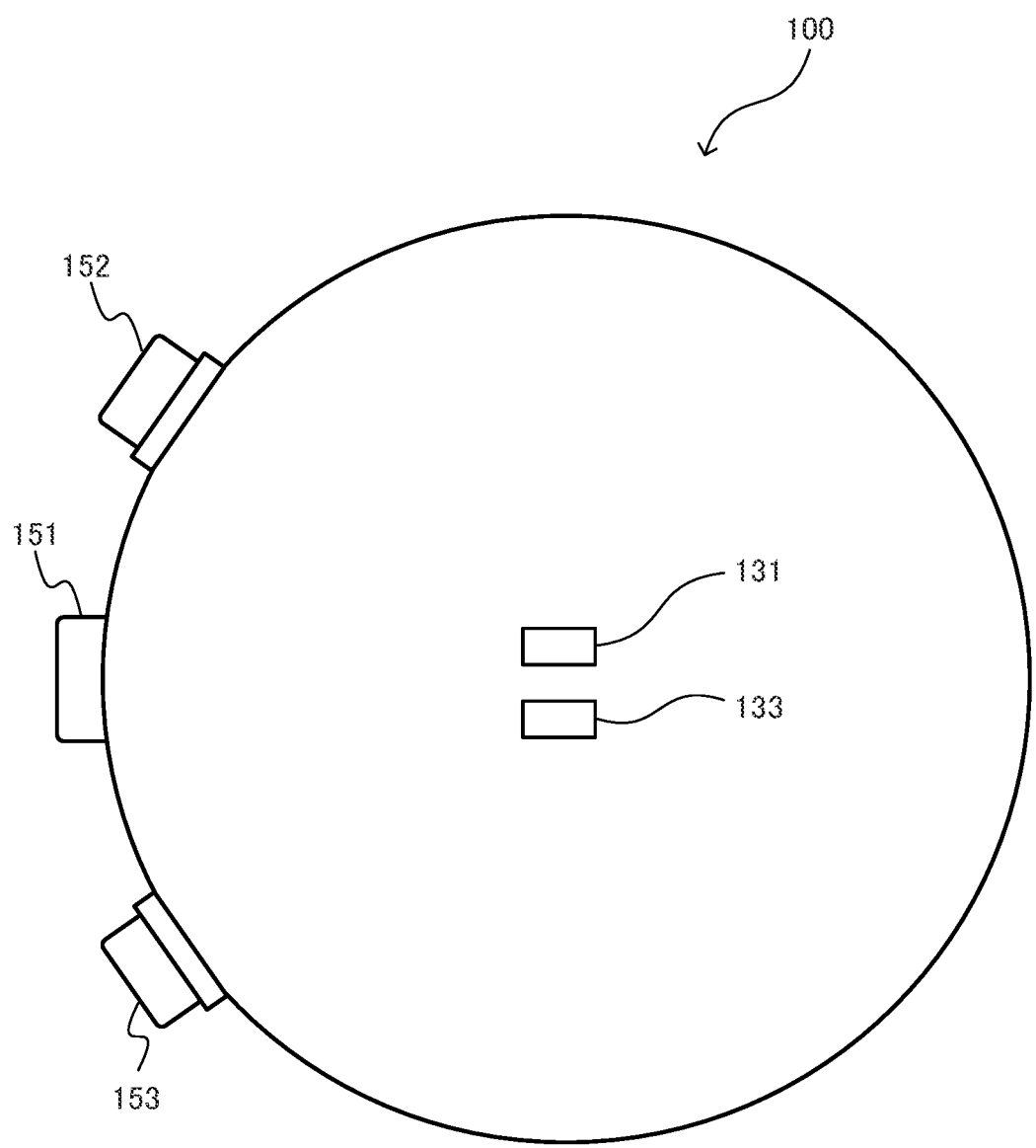
FIG. 3 is a drawing illustrating an example of the appearance of the electronic device from a back side.

As illustrated in FIG. 2, the electronic device 100 includes a crown 151 and push button switches 152 and 153 on a side surface, and receives operations of the user. Additionally, as illustrated in FIG. 3, the electronic device 100 includes, on a back side, the pulse wave sensor 131 and the pressure sensor 133. The processor 110 acquires the pulse rate of the user on the basis of a pulse wave signal detected by the pulse wave sensor 131, and acquires a pressure (wearing pressure) of the wearing on the arm of the user by the pressure sensor 133.

The electronic device 100 acquires the pulse rate of the user on the basis of temporal changes of the received light intensity (the AD value) obtained by the pulse wave sensor 131. At that time, when the electronic device 100 is not being appropriately worn or blood flow is low, the received light intensity decreases and acquisition accuracy of the pulse rate is negatively affected.

With the electronic device 100, the pulse rate is displayed on the pulse rate display 145 and, also, the acquisition accuracy of that pulse rate is expressed as a three-level reliability index and is displayed on the small hand display 146. In the example illustrated in FIG. 2, a case is displayed in which the pulse rate is 76 beats per minute (BPM) and the reliability index is 2 (acquisition accuracy is normal). In the example of FIG. 2, the pulse rate is displayed by numbers (characters) and, as such, even when it is difficult to read the gradations of the analog display, the pulse rate can easily be ascertained.

As illustrated in FIG. 2, with the electronic device 100 that includes the small hand display 146, the reliability index can be displayed on the small hand display 146. However, in a configuration in which only the pulse rate is displayed on the pulse rate display 145, and only the reliability index is displayed on the small hand display 146, the user must confirm two displays, namely the pulse rate display 145 and the small hand display 146, in order to ascertain the pulse rate and the reliability of that pulse rate.

With the electronic device 100, when displaying the pulse rate on the pulse rate display 145, the displaying is carried out in an output mode corresponding to the reliability index so that the user can also ascertain the reliability index by confirming the pulse rate display 145 alone.

Figure 4:
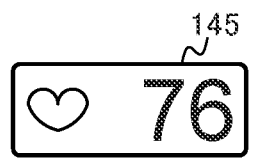
FIG. 4 is a drawing illustrating a first example in which a pulse rate is displayed on a pulse rate display in an output mode corresponding to the reliability of the pulse rate.
Figure 5:
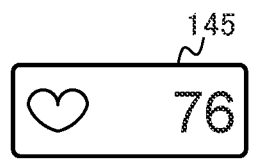
FIG. 5 is a drawing illustrating a second example in which a pulse rate is displayed on the pulse rate display in an output mode corresponding to the reliability of the pulse rate.

In one example, when the reliability index is 3 (acquisition accuracy is good), the pulse rate is displayed on the pulse rate display 145 in large characters, as illustrated in FIG. 4. When the reliability index is 2 (acquisition accuracy is normal), the pulse rate is displayed on the pulse rate display 145 in medium characters, as illustrated in FIG. 5. When the reliability index is 1 (acquisition accuracy is poor), the pulse rate is displayed on the pulse rate display 145 in small characters, as illustrated in FIG. 6.

FIGS. 4 to 6 illustrate examples in which the reliability index of the pulse rate is expressed by the size of the characters displaying the pulse rate, but the output mode for representing the reliability index is not limited to output modes based on character size. For example, the electronic device 100 may express the reliability index by changing at least one attribute among the presence/absence of the pulse rate display itself, and the size, darkness, color, font, or the like of the characters displaying the pulse rate. By configuring in this manner, the user can ascertain the pulse rate and the reliability of that pulse rate by viewing the pulse rate display 145 alone.

Figure 7:
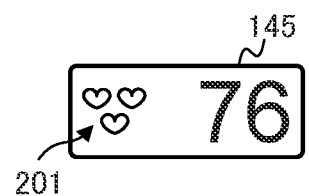
FIG. 7 is a drawing illustrating a fourth example in which a pulse rate is displayed on the pulse rate display in an output mode corresponding to the reliability of the pulse rate.
Figure 8:
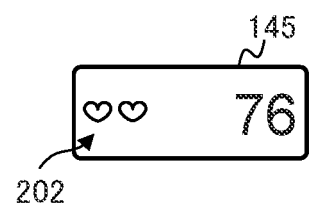
FIG. 8 is a drawing illustrating a fifth example in which a pulse rate is displayed on the pulse rate display in an output mode corresponding to the reliability of the pulse rate.
Figure 9:
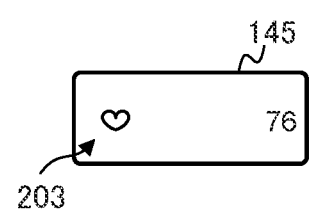
FIG. 9 is a drawing illustrating a sixth example in which a pulse rate is displayed on the pulse rate display in an output mode corresponding to the reliability of the pulse rate.

The electronic device 100 may display a mark expressing the reliability index on the pulse rate display 145. For example, when the reliability index is 3 (acquisition accuracy is good), the electronic device 100 may display that the reliability index is 3 by displaying three marks such as marks 201 of FIG. 7. When the reliability index is 2 (acquisition accuracy is normal), the electronic device 100 may display that the reliability index is 2 by displaying two marks such as marks 202 of FIG. 8. When the reliability index is 1 (acquisition accuracy is poor), the electronic device 100 may display that the reliability index is 1 by displaying one mark such as a mark 203 of FIG. 9. Note that, in FIGS. 7 to 9, the reliability index is expressed by the number of marks, but the reliability index may be expressed by changing the size, the darkness, the color, the type, or the like of the marks in accordance with the reliability without changing the number of the marks.

Figure 10:
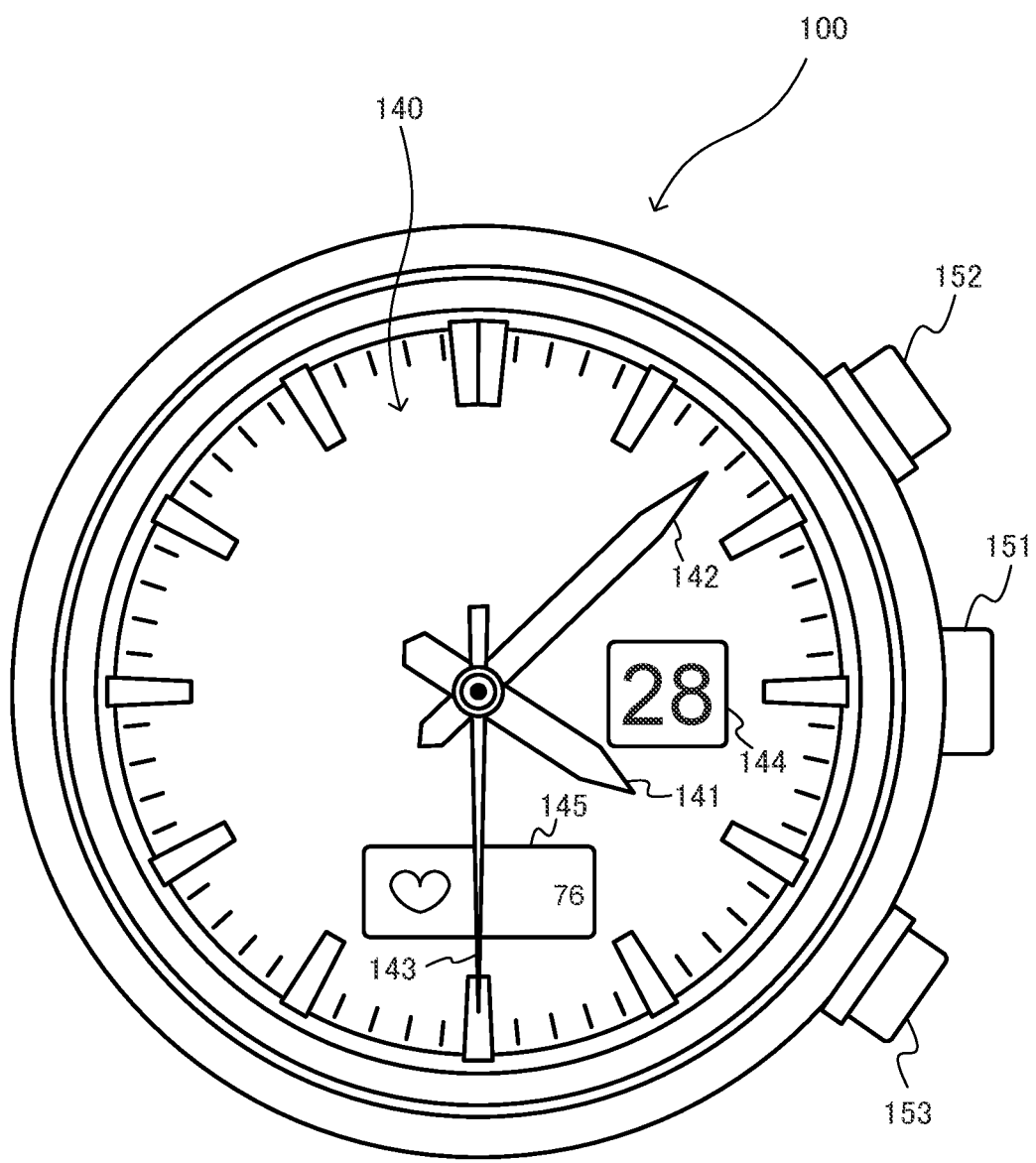
FIG. 10 is a drawing illustrating another example of the appearance of the electronic device from the front side.

In an electronic device 100 that does not include the small hand display 146, a configuration is possible in which the second hand 143 is interrupted from displaying the second count while the pulse rate is being displayed, and the reliability index is displayed by the second hand 143. For example, as illustrated in FIG. 10, the electronic device 100 may display that the reliability index is 1 by the second hand 143 pointing in a good reliability direction (for example, in FIG. 10, the six o'clock direction). While not illustrated in the drawings, likewise, the electronic device 100 may display that the reliability index is 2 by the second hand 143 pointing in a normal reliability direction (for example, the three o'clock direction), and may display that the reliability index is 1 by the second hand 143 pointing in a poor reliability direction (for example, the twelve o'clock direction). By expressing the reliability index by the marks or hands, the reliability index can be displayed to the user in a more understandable manner compared to when expressing the reliability index by the output mode alone.

Figure 11:
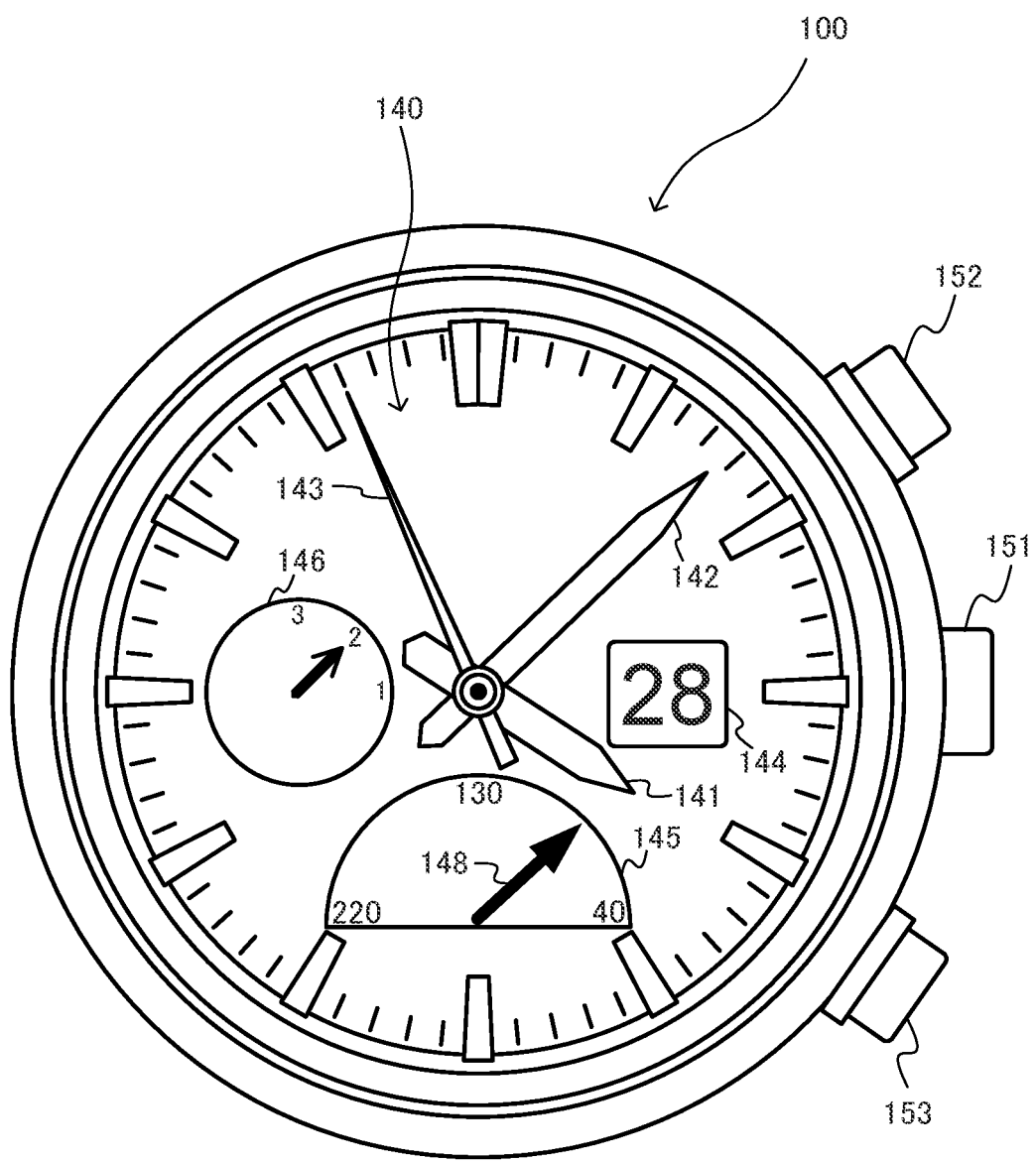
FIG. 11 is a drawing illustrating yet another example of the appearance of the electronic device from the front side.

The display of the pulse rate on the pulse rate display 145 is not limited to a digital display. As illustrated in FIG. 11, the electronic device 100 may include a pulse rate display 145 that analog-displays the pulse rate by a pointer 148. By displaying the pulse rate by the pointer 148, the user can visually ascertain a magnitude of the pulse rate by the angle of the pointer 148, without recognizing numbers.

In an electronic device 100 that does not include the pulse rate display 145, a configuration is possible in which the second hand 143 is interrupted from displaying the second count while the pulse rate is being displayed, and the pulse rate is displayed by the second hand 143. In this case, the manner in which the pulse rate and the gradations (gradation corresponding to one second) are associated can be determined as desired. For example, in a case in which the step width when rotating of the second hand 143 is set to ¼ gradation (second) and one gradation (amount corresponding to one second) is associated with a 4 BPM portion of the pulse rate, the gradations of 0 to 60 seconds can be associated with pulse rates of 0 to 240 BPM. Additionally, for example, in a case in which the step width when rotating of the second hand 143 is set to ⅓ gradation (second) and one gradation (amount corresponding to one second) is associated with a 3 BPM portion of the pulse rate, the gradations of 0 to 60 seconds can be associated with pulse rates of 40 to 220 BPM. In these cases as well, the user can visually ascertain the magnitude of the pulse rate by the angle of the second hand 143, without recognizing numbers.

Moreover, the reliability index of the pulse rate can be expressed by a vibration (shaking) of the pointer 148 (or the second hand 143). For example, the electronic device 100 may be configured such that the user is enabled to ascertain the reliability index by the pointer 148 (or the second hand 143) not vibrating when the reliability index is 3 (acquisition accuracy is good), the pointer 148 (or the second hand 143) vibrating in a small manner when the reliability index is 2 (acquisition accuracy is normal), and the pointer 148 (or the second hand 143) vibrating in a large manner when the reliability index is 1 (acquisition accuracy is poor). By changing the magnitude of the vibration in accordance with the reliability index, the user can not only visually ascertain the pulse rate, but also the reliability of that pulse rate.

Figure 12:
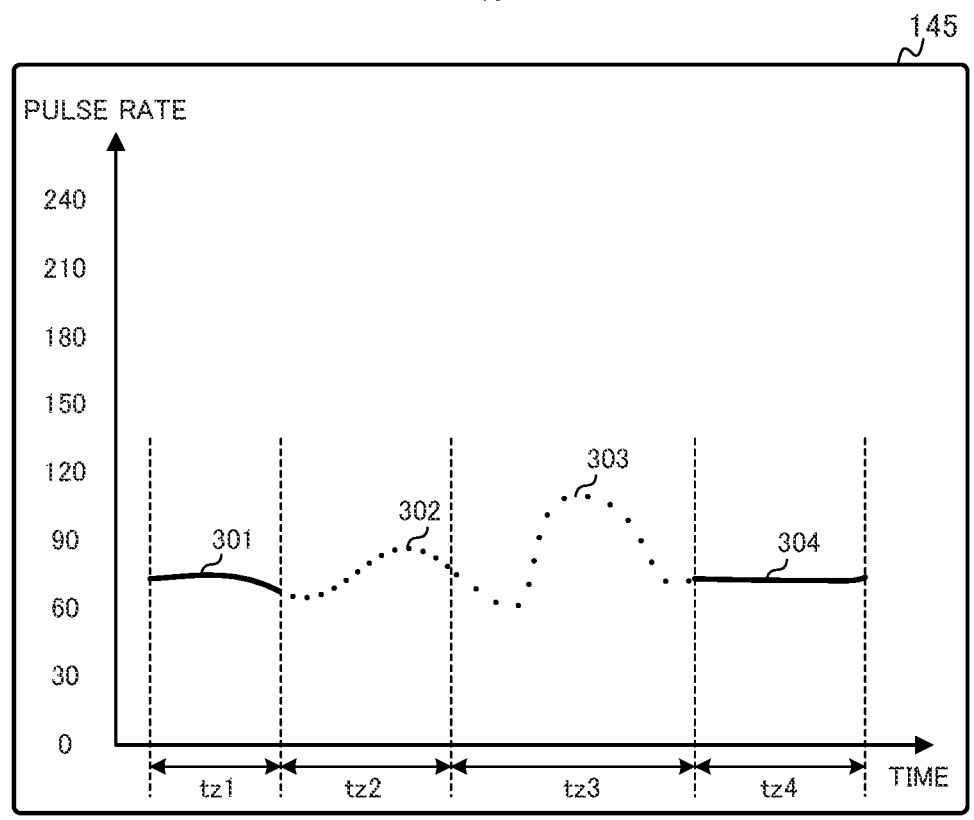
FIG. 12 is a drawing illustrating a seventh example in which a pulse rate is displayed on the pulse rate display in an output mode corresponding to the reliability of the pulse rate.

The display of the pulse rate on the pulse rate display 145 is not limited to a digital display or an analog display. As illustrated in FIG. 12, the electronic device 100 may display the pulse rate on the pulse rate display 145 as a graph. By displaying as a graph, the user can easily ascertain temporal changes of the pulse rate. Note that, when displaying as a graph on the display 140 of the wristwatch-type electronic device 100, there is a possibility that the graph will be very small and difficult to view. However, the electronic device 100 may use the communicator 170 to send information about the pulse rate and the reliability index of that pulse rate to another device such as a smartphone, a PC, or the like, and display the pulse rate as a graph on that other device.

Moreover, when displaying the pulse rate as a graph, the electronic device 100 or the other device may express the reliability index by changing at least one attribute among the presence/absence of plotting of the graph itself, a line type (solid, dotted, dashed), a thickness (line width), a color, a darkness, or the like of the line used to plot the graph.

For example, in FIG. 12, since the reliability index in a time frame tz1 is 3 (acquisition accuracy is good), the graph is plotted with a solid line 301, since the reliability index in a time frame tz2 is 2 (acquisition accuracy is normal), the graph is plotted with a narrowly spaced dotted line 302, since the reliability index in a time frame tz3 is 1 (acquisition accuracy is poor), the graph is plotted with a widely spaced dotted line 303, and since the reliability index in a time frame tz4 is 3 (acquisition accuracy is good), the graph is plotted with a solid line 304. By configuring in this manner, the user can ascertain temporal changes in the pulse rate together with temporal changes in the reliability of that pulse rate.

FIG. 13 illustrates a table summarizing the output modes corresponding to the reliability indexes of the pulse rate described above. Among these output modes, regarding the magnitude of the vibration of the pointer, various setting are possible for the frequency of the vibration (vibration frequency) and the amplitude (swing width with respect to the pointer) of the pointer. However, in this case, the processor 110 sets the frequency of the vibration to a first vibration frequency (for example, 3 Hz) and the amplitude to a first amplitude value (for example, 2) when the reliability index is 1 (acquisition accuracy is poor), the frequency of the vibration to a second vibration frequency (for example, 3 Hz) and the amplitude to a second amplitude value (for example, 1) when the reliability index is 2 (acquisition accuracy is normal), and sets the pointer to not vibrate (amplitude to 0) when the reliability index is 3 (acquisition accuracy is good).

For example, FIG. 14 illustrates that the pointer is not vibrated when the reliability index is 3 (acquisition accuracy is good), the pointer is vibrated at the vibration frequency of 3 Hz when the reliability index is 2 (acquisition accuracy is normal) or 1 (acquisition accuracy is poor), and the swing width (the amplitude) with respect to the pointer at these times is set to ±1 when the reliability index is 2 and to ±2 when the reliability index is 1.

Note that, in the present embodiment, the output modes are described for a case in which the reliability index is divided into the three levels of 1 to 3, but setting the number of levels of the reliability index to three levels is merely an example. The acquisition accuracy may be divided in a finer manner, and the number of levels of the reliability index may be set to four or more. In such a case, the sizes, darknesses, or the like of the characters displaying the pulse rate can be set in a finer manner, and the vibration frequency of the pointer or the swing width with respect to the pointer that expresses the pulse rate can be set in a finer manner Conversely, the number of levels of the reliability index may be set to two levels, namely 1 (poor) and 2 (good).

A configuration is possible in which the electronic device 100 not only displays the pulse rate on the pulse rate display 145 (first outputter) in the output mode corresponding to the reliability of that pulse rate, but also displays the reliability index on the small hand display 146 (second outputter). Displaying the reliability on the small hand display 146 makes it possible for the user to easily ascertain the correspondence between the reliability index and the "output mode corresponding to the reliability." Then, after ascertaining this correspondence, the user can simultaneously ascertain the pulse rate and the reliability of that pulse rate by viewing the pulse rate display 145 alone. Note that the display that displays the pulse rate in the output mode corresponding to the reliability of that pulse rate, and the display that displays the reliability index may be the same display.

Figure 15:
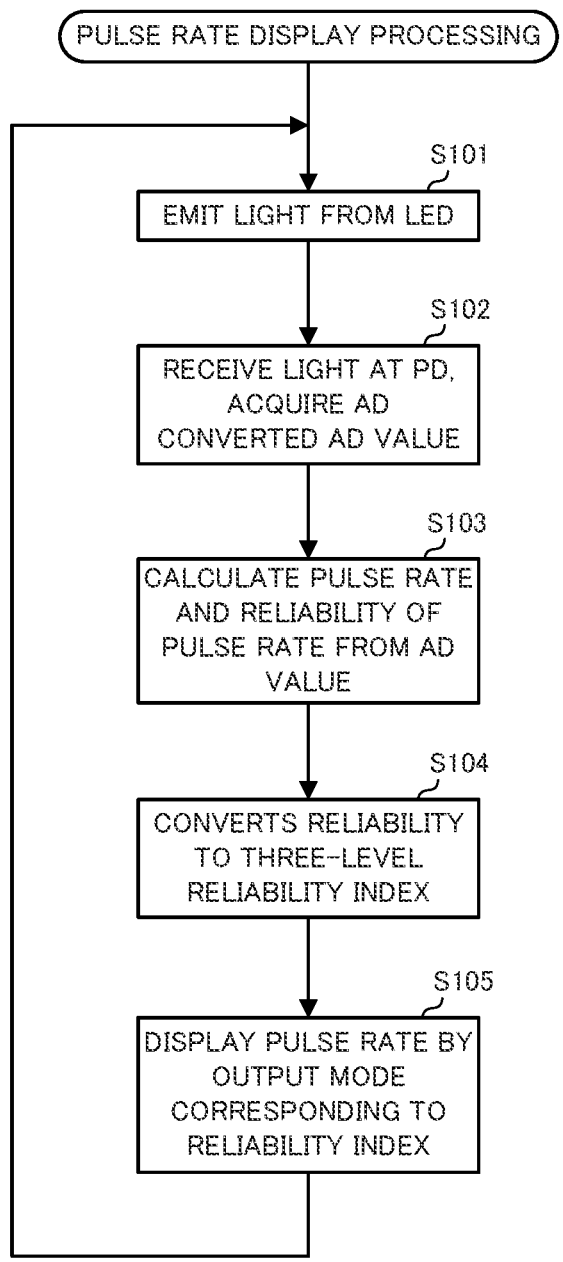
FIG. 15 is an example of a flowchart of pulse rate display processing according to an embodiment.

Next, pulse rate display processing is described while referencing FIG. 15. The pulse rate display processing is processing in which the electronic device 100 displays the pulse rate in the output mode corresponding to the reliability of that pulse rate. The output mode may be set in advance (for example, to a character size) on the basis of the specifications or the like of the pulse rate display 145 of the electronic device 100, or may be changeable by user operations. The pulse rate display processing starts when the user operates the operation receiver 150 to command the electronic device 100 to perform a pulse rate display. Additionally, a configuration is possible in which, when the electronic device 100 starts up, the pulse rate display processing starts in parallel with other processes.

When the pulse rate display processing starts, firstly, the processor 110 causes the LED of the pulse wave sensor 131 to emit light (step S101). The light emitted from the LED and that reflects at the living body is received by the PD of the pulse wave sensor 131, and the processor 110 acquires the AD value obtained by converting the received light intensity at the PD using the AD converter (step S102).

Then, the processor 110 calculates, from the AD value, the pulse rate and the reliability of that pulse rate (step S103). Note that the method for calculating the reliability of the pulse rate from the AD value can be determined as desired. For example, the reliability can be calculated on the basis of a magnitude of an amount of change of the AD value (difference between a maximum value and a minimum value of the AD value in a predetermined period (for example, 10 seconds)), a signal noise (SN) ratio, or the like. Hemoglobin in the blood has a property of absorbing light and, as such, the received light intensity (=AD value) at the PD decreases when blood flow is high but, when the amount of change of the AD value is small, the difference between the AD values between when blood flow is high and when low decreases, making it more difficult to detect the pulse. Due to this, the reliability of the pulse rate decreases as the amount of change of the AD value decreases. Conversely, as the amount of change of the AD value increases, changes in the blood flow can be more accurately ascertained and, as such, the reliability of the pulse rate increases. The same is true for the SN ratio and, as the SN ratio increases, changes in the blood flow can be more accurately ascertained and, as such, the reliability of the pulse rate increases. However, when the SN ratio is small, it is more difficult to detect the pulse and, consequently, the reliability of the pulse rate decreases.

Next, the processor 110 converts the reliability to the three-level reliability index (step S104). This three-level conversion method can be determined as desired. For example, when the reliability is expressed as a numerical value from 0 to 100, the reliability index is set to 1 when the reliability is less than a first threshold (for example, 50), is set to 2 when the reliability is greater than or equal to the first threshold and less than a second threshold (for example, 80), and is set to 3 when the reliability is greater than or equal to the second threshold.

Then, the processor 110 displays the pulse rate on the pulse rate display 145 in the output mode corresponding to the reliability index (step S105), and returns to step S101.

As a result of the pulse rate display processing described above, the electronic device 100 can calculate the reliability of the pulse rate and display the pulse rate on the pulse rate display 145 in the output mode associated with the calculated reliability. As such, the user can ascertain not only the pulse rate, but also the reliability of that pulse rate by viewing the pulse rate alone.

Figure 16:
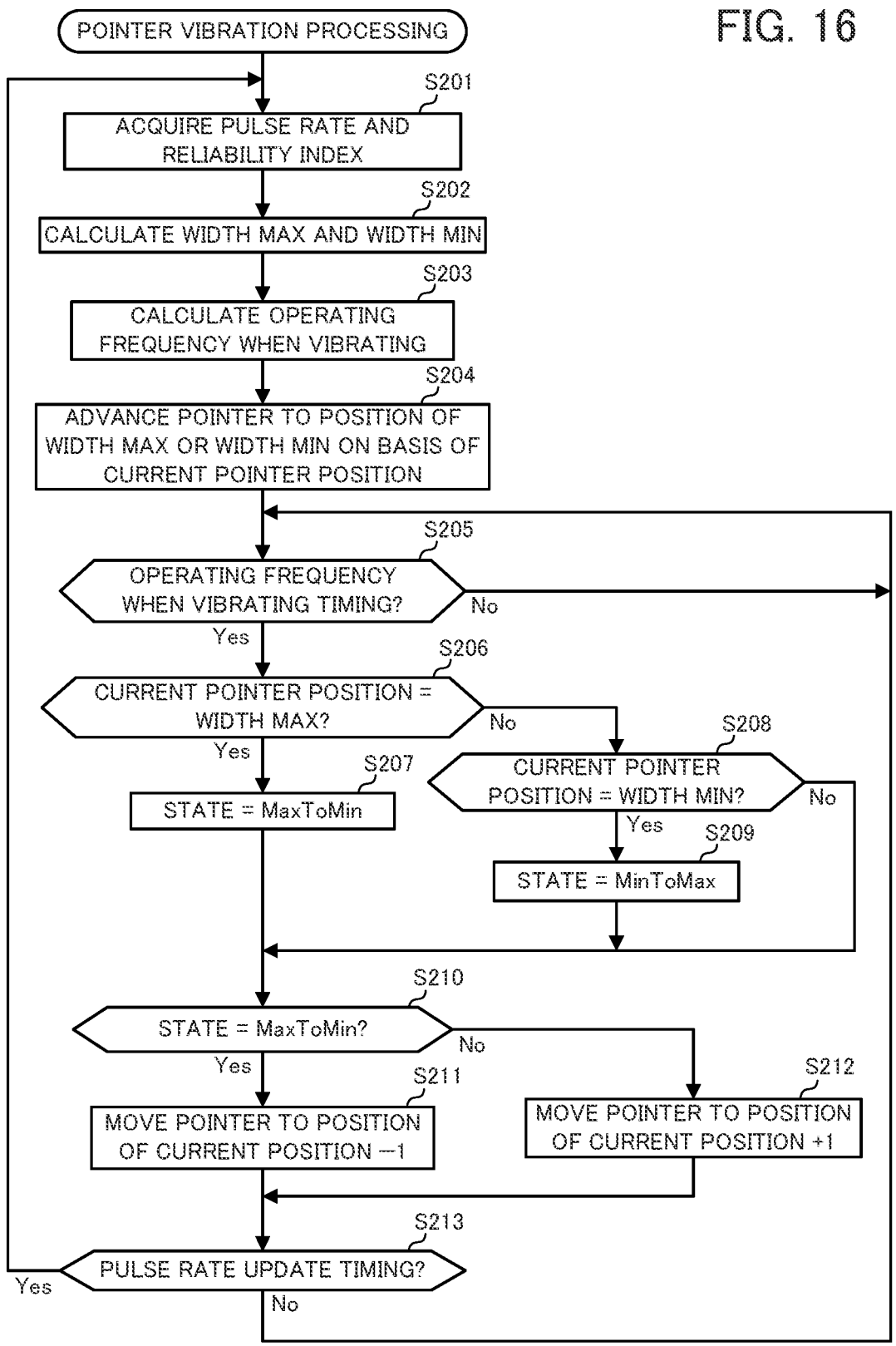
FIG. 16 is an example of a flowchart of pointer vibration processing according to an embodiment.

Next, pointer vibration processing is described while referencing FIG. 16. This pointer vibration processing is processing for displaying the pulse rate in an output mode in which the pointer is vibrated in accordance with the reliability index of the pulse rate. This pointer vibration processing is executed in parallel with the pulse rate display processing described above in cases in which the pulse rate display 145 displays the pulse rate by the pointer and displays the pulse rate in the output mode in which the pointer is vibrated in accordance with the reliability index of the pulse rate. Note that the vibration frequency and the swing width (amplitude) with respect to the pointer are (as in the example illustrated in FIG. 14) stored in advance in the storage 120.

Firstly, the processor 110 acquires the pulse rate and the reliability index calculated in the pulse rate display processing described above (step S201). Then, the processor 110 calculates, on the basis of pulse rate, the reliability index, and the swing width (amplitude) with respect to the pointer, a width MAX and a width MIN using the following equations (step S202):

width MAX=pulse rate+"swing width with respect to the pointer" corresponding to the reliability index width MIN=pulse rate−"swing width with respect to the pointer" corresponding to the reliability index For example, when the pulse rate is 100 BPM, the reliability index is 1 and the swing width with respect to the pointer is the value illustrated in FIG. 14, the width MAX=100+2=102, and the width MIN=100−2=98.

Next, the processor 110 uses the following equation to calculate, on the basis of the width MAX, the width MIN, and the swing width (amplitude) with respect to the pointer, an operating frequency when vibrating (step S203):

operating frequency when vibrating=(width MAX−width MIN)×2×vibration frequency

Note that the operating frequency when vibrating is a frequency for moving the pointer forward an angle corresponding to a pulse rate of 1. Additionally, the reason (width MAX−width MIN) is multiplied by 2 is to cause the pointer to oscillate back and forth one time between the width MAX and the width MIN at the frequency set by the "vibration frequency."

For example, when the width MAX is 102, the width MIN is 98, and the vibration frequency is 3 Hz, the operating frequency when vibrating is (102−98)×2×3=24 Hz.

Next, the processor 110 advances the pointer to the position of the width MAX or the width MIN on the basis of a current pointer position (step S204). Specifically, the processor 110 advances the pointer to the position of the width MAX or the width MIN that is closer to the current pointer position (to either when the distance is the same, for example, to the width MIN). For example, when the current pointer position is 90, the width MAX is 102 and the width MIN is 98, the pointer is advanced to the position of the width MIN.

Then, the processor 110 determines whether a current timing is an operating frequency when vibrating timing (step S205). When a determination is made that the current timing is not the operating frequency when vibrating timing (step S205; No), step S205 is executed.

When a determination is made that the current timing is the operating frequency when vibrating timing (step S205; Yes), the processor 110 determines whether the current pointer position is the position of the width MAX (step S206). When the current pointer position is the position of the width MAX (step S206; Yes), the processor 110 substitutes "MaxToMin" for a variable expressing the state (step S207), and executes step S210.

When a determination is made that the current pointer position is not the position of the width MAX, (step S206; No), the processor 110 determines whether the current pointer position is the position of the width MIN (step S208). When the current pointer position is the position of the width MIN (step S208; Yes), the processor 110 substitutes "MinToMax" for the variable expressing the state (step S209), and executes step S210. When a determination is made that the current pointer position is not the position of the width MIN, (step S208; No), the processor 110 executes step S210.

In step S210, the processor 110 determines whether the value of the variable expressing the state is "MaxToMin." When the value of the variable expressing the state is "MaxToMin" (step S210; Yes), the processor 110 rotates the pointer to a position of the current position−1 (step S211), and executes step S213.

When the value of the variable expressing the state is not "MaxToMin" (step S210; No), the processor 110 rotates the pointer to a position of the current position+1 (step S212), and executes step S213.

In step S213, the processor 110 determines whether the current timing is a pulse rate update timing (step S213).

When a determination is made that the current timing is the pulse rate update timing (step S213; Yes), the processor 110 executes step S201.

When a determination is made that the current timing is not the pulse rate update timing (step S213; No), the processor 110 executes step S205.

As a result of the pointer vibration processing described above, the pointer vibrates centered on the current "pulse rate" at the frequency set to the "vibration frequency" and the amplitude set to the "swing width with respect to the pointer." Accordingly, the user can simultaneously ascertain the pulse rate and the reliability index of that pulse rate by confirming the pointer alone.

Countermeasures for Preventing Decreases in Reliability

While there may be various causes for decreases in the reliability of the pulse rate, fundamentally, the reliability of the pulse rate decreases when the AD value is small, that is, when the received light intensity at the PD decreases. Many causes can be thought of for decreased received light intensity at the PD, but typical causes include the wearing pressure being inappropriate (excessively tight, excessively loose), and the blood flow reflecting the light of the LED being weak. Additionally, when a person feels cold, typically, blood vessels near the surface of the body contract and blood flow weakens.

The electronic device 100 includes the pressure sensor 133 and the temperature sensor 134 and, as such, can use these components to determine if the wearing pressure is appropriate, if the ambient air temperature is not excessively cold, and the like. Additionally, the electronic device 100 can acquire, from the internet via the communicator 170, weather information (air temperature, humidity, wind speed, and the like) at the current geographical location to calculate a sensible temperature outdoors and, as such, can determine whether the calculated sensible temperature is excessively cold to the user. Accordingly, when the reliability of the pulse rate is low, it is possible to infer the cause of the decreased reliability on the basis of results of these determination results.

Figure 17:
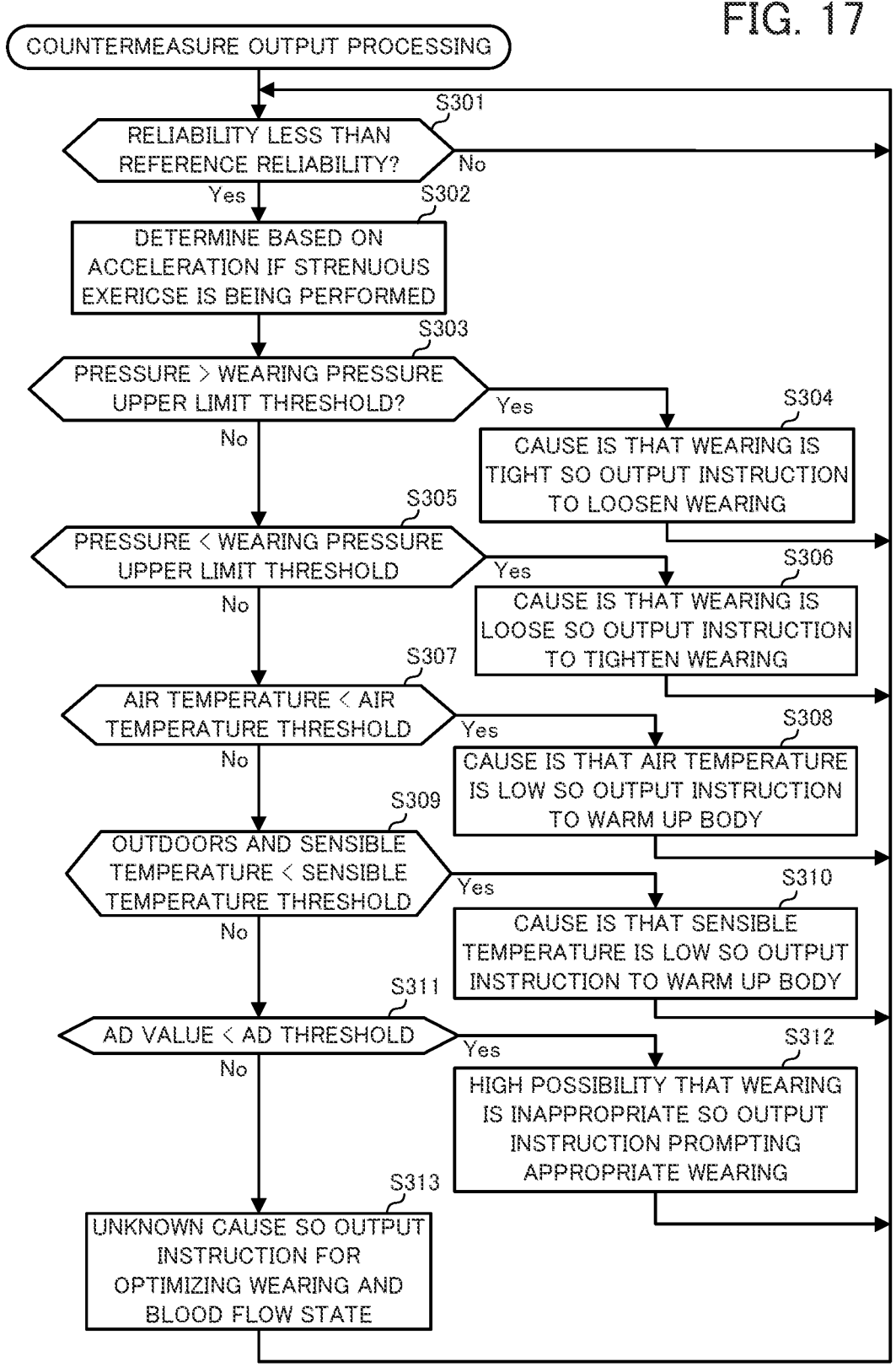
FIG. 17 is an example of a flowchart of countermeasure output processing according to an embodiment.

Next, countermeasure output processing is described while referencing FIG. 17. In the countermeasure output processing, the electronic device 100 infers the cause of decreased reliability of the pulse rate and outputs a countermeasure for preventing reliability decreases. The countermeasure output processing starts when the user operates the operation receiver 150 to command the electronic device 100 to output a reliability decrease prevention countermeasure. Additionally, a configuration is possible in which, when the electronic device 100 starts up, the pulse rate display processing starts, or the like, this countermeasure output processing starts in parallel with other processes.

When the countermeasure output processing starts, firstly, the processor 110 determines whether the value of the reliability of the pulse rate being currently acquired is less than a reference reliability (assuming the reliability is a numerical value from 0 to 100, 50, for example) (step S301). When the value of the reliability is greater than or equal to the reference reliability (step S301; No), step S301 is executed.

When the value of the reliability is less than the reference reliability (step S301; Yes), the processor 110 determines, on the basis of the acceleration detected by the acceleration sensor 132, whether the current user is performing strenuous exercise (step S302). For example, the processor 110 determines that the user is performing strenuous exercise when the acceleration detected by the acceleration sensor 132 (acceleration detector) is greater than an acceleration threshold.

Next, the processor 110 determines whether the pressure detected by the pressure sensor 133 exceeds a wearing pressure upper limit threshold (step S303). As the wearing pressure upper limit threshold, a minimum pressure value at which there is a possibility that the wearing of the electronic device 100 on the wrist is excessively tight and the pulse wave sensor 131 cannot appropriately detect the pulse wave is set in advance.

When the pressure detected by the pressure sensor 133 exceeds the wearing pressure upper limit threshold (step S303; Yes), the processor 110 infers that the cause of the low reliability is because the wearing is tight, and causes the outputter 155 to output an instruction to loosen the wearing (step S304). For example, the processor 110 causes the outputter 155 to output a voice announcement such as "Please loosen the wearing." At this time, when the processor 110 makes a determination in step S302 of "performing strenuous exercise", content suggesting the possibility that large acceleration (exercise) is the cause is included in the instruction content. For example, the voice announcement is changed to "Please loosen the wearing when exercising." Then, step S301 is executed.

When the pressure detected by the pressure sensor 133 is less than or equal to the wearing pressure upper limit threshold (step S303; No), the processor 110 determines whether the pressure detected by the pressure sensor 133 is less than a wearing pressure lower limit threshold (step S305). As the wearing pressure lower limit threshold, a maximum pressure value at which there is a possibility that the wearing of the electronic device 100 on the wrist is excessively loose and the pulse wave sensor 131 cannot appropriately detect the pulse wave is set in advance.

When the pressure detected by the pressure sensor 133 is less than the wearing pressure lower limit threshold (step S305; Yes), the processor 110 infers that the cause of the low reliability is because the wearing is loose, and causes the outputter 155 to output a notification such as an instruction to tighten the wearing (step S306). For example, the processor 110 causes the outputter 155 to output a voice announcement such as "Please tighten the wearing." At this time, when the processor 110 makes a determination in step S302 of "performing strenuous exercise", content suggesting the possibility that large acceleration (exercise) is the cause is included in the notification content. For example, the voice announcement is changed to "Please tighten the wearing when exercising." Then, step S301 is executed.

When the pressure detected by the pressure sensor 133 is greater than or equal to the wearing pressure lower limit threshold (step S305; No), the processor 110 determines whether the air temperature detected by the temperature sensor 134 is less than an air temperature threshold (step S307). As the air temperature threshold, a maximum air temperature (for example, 10° C.) at which there is a possibility that the blood flow of the user is low and the pulse wave sensor 131 cannot appropriately detect the pulse wave is set in advance.

When the air temperature detected by the temperature sensor 134 is less than the air temperature threshold (step S307; Yes), the processor 110 infers that the cause of the low reliability is because the air temperature is low and blood flow is low, and causes the outputter 155 to output a notification such as an instruction to increase the blood flow (step S308). For example, the processor 110 causes the outputter 155 to output a voice announcement such as "Please warm up and get your blood flowing." At this time, when the processor 110 makes a determination in step S302 of "performing strenuous exercise", content suggesting the possibility that large acceleration (exercise) is the cause is included in the notification content. For example, the voice announcement is changed to "Warm up properly before beginning strenuous exercise." Then, step S301 is executed.

When the air temperature detected by the temperature sensor 134 is greater than or equal to the air temperature threshold (step S307; No), the processor 110 determines whether the current position is outdoors and, moreover, whether the sensible temperature is less than a sensible temperature threshold (step S309). The processor 110 can determine whether the current position is outdoors on the basis of whether the position acquirer 180 can receive the satellite signal. Additionally, regarding the sensible temperature, the processor 110 uses the communicator 170 to acquire weather data (air temperature, humidity, wind speed) at the current position (acquired by the position acquirer 180) from the internet, and calculates the sensible temperature from the weather data. As the sensible temperature threshold, a maximum sensible temperature (for example, 10° C.) at which there is a possibility that the blood flow of the user is low and the pulse wave sensor 131 cannot appropriately detect the pulse wave is set in advance.

When the current position is outdoors and, also, the sensible temperature is less than the sensible temperature threshold (step S309; Yes), the processor 110 infers that the cause of the low reliability is because the sensible temperature is low and blood flow is low, and causes the outputter 155 to output a notification such as an instruction to increase the blood flow (step S310). For example, the processor 110 causes the outputter 155 to output a voice announcement such as "Please warm up and get your blood flowing." At this time, when the processor 110 makes a determination in step S302 of "performing strenuous exercise", content suggesting the possibility that large acceleration (exercise) is the cause is included in the notification content. For example, the voice announcement is changed to "Warm up properly before beginning strenuous exercise." Then, step S301 is executed.

When the current position is indoors or the sensible temperature is greater than or equal to the sensible temperature threshold (step S309; No), the processor 110 determines whether the AD value obtained from the pulse wave sensor 131 is less than an AD threshold (step S311). As the AD threshold, a maximum value at which there is a possibility that the AD value is excessively small and the pulse rate cannot be appropriately calculated is set in advance.

When the AD value obtained from the pulse wave sensor 131 is less than the AD threshold (step S311; Yes), the processor 110 infers that the cause of the low reliability is because the wearing is inappropriate, and causes the outputter 155 to output a notification such as an instruction prompting appropriate wearing (step S312). For example, the processor 110 causes the outputter 155 to output a voice announcement such as "Please wear properly." At this time, when the processor 110 makes a determination in step S302 of "performing strenuous exercise", content suggesting the possibility that large acceleration (exercise) is the cause is included in the notification content. For example, the voice announcement is changed to "Please tighten the wearing when exercising." Then, step S301 is executed.

When the AD value obtained from the pulse wave sensor 131 is greater than or equal to the AD threshold (step S311; No), the processor 110 infers that the cause of the low reliability is unknown, and causes the outputter 155 to output a notification such as an instruction for a general countermeasure (step S313). For example, the processor 110 causes the outputter 155 to output a voice announcement such as "Wear appropriately, warm up and get your blood flowing." At this time, when the processor 110 makes a determination in step S302 of "performing strenuous exercise", content suggesting the possibility that large acceleration (exercise) is the cause is included in the notification content. For example, the voice announcement is changed to "Wear properly and warm up properly when exercising." Thereafter, step S301 is executed.

As a result of the countermeasure output processing described above, the electronic device 100 infers the cause of the reduced reliability of the pulse rate, and outputs a notification (for example, a countermeasure for preventing reliability decreases) related to the inferred cause. As such, the user can improve the reliability of the pulse rate by following the outputted countermeasure. Additionally, the countermeasure is announced by voice and, as such, the user can ascertain the countermeasure without confirming the display 140. Moreover, step S308 and the following steps are performed after a determination has been made that there are no problems with the wearing pressure in steps S303 to S306. As such, when a plurality of causes are possible as the cause of the decreased reliability, firstly, the user is prompted to carry out proper wearing. Due to this, it is possible to routinely eliminate one cause at a time, even when there are a plurality of causes.

Note that a configuration is possible in which the electronic device 100 includes a body temperature sensor that measures a body temperature of the user in place of or in addition to the temperature sensor 134 that measures the ambient air temperature. In such a case, in the countermeasure output processing, the processor 110 determines whether the body temperature measured by the body temperature sensor is less than a body temperature threshold (for example, 35° C.). Then, when the body temperature is less than the body temperature threshold, the processor 110 infers that the cause of the low reliability is because the body temperature is low and blood flow is low, and causes the outputter 155 to output a notification such as an instruction to increase the blood flow. For example, the processor 110 causes the outputter 155 to output a voice announcement such as "Please warm up and get your blood flowing."

A configuration is possible in which the electronic device 100 includes a sound outputter that outputs sound effects, and expresses the cause of the reliability decrease by the type of sound output from the sound outputter. For example, a sound effect (for example, "beep") indicating that the wearing is tight is output when it is inferred that the wearing is excessively tight, a sound effect (for example, "beep beep") indicating that the wearing is loose is output when it is inferred that the wearing is excessively loose, a sound effect (for example, "boo") indicating that the air temperature is low is output when it is inferred that the air temperature is low, and the like. Manufacturing costs of the electronic device 100 and the amount of processing of the processor 110 can be reduced by outputting sound effects instead of voice announcements. Even when using simple sound effects, when, for example, the user hears the sound "beep beep", the user will understand that "because the wearing is loose, the wearing should be tightened" and take action.

The output of electronic device 100 is not limited to voice announcements and sound effects. A configuration is possible in which the electronic device 100 includes a character display capable of displaying characters, for example, and the countermeasures are displayed on the character display. By displaying the countermeasures on the character display, the user can ascertain the countermeasure for preventing the reliability decrease even in situations in which the voice announcements cannot be heard such as when in a noisy environment.

A configuration is possible in which the electronic device 100 includes, as the outputter 155, a vibrator that vibrates the electronic device 100, and the cause of the reliability decrease is expressed by the type of vibration caused by the vibrator. For example, a vibration (for example, "buzz") indicating that the wearing is tight is performed when it is inferred that the wearing is excessively tight, a sound effect (for example, "buzz buzz") indicating that the wearing is loose is performed when it is inferred that the wearing is excessively loose, a sound effect (for example, "burr") indicating that the air temperature is low is performed when it is inferred that the air temperature is low, and the like. By vibrating instead of performing voice announcements, the amount of processing of the processor 110 can be reduced, and the user can implement the countermeasure for preventing the reliability decrease even when in loud or noisy situations.

A configuration is possible in which the electronic device 100 includes, as the outputter 155, a light emitter (for example, a LED), and expresses the cause of the reliability decrease by the type of emitted light emitted by the light emitter. For example, a light emission (for example, repeating lighting for 0.1 seconds at 0.1 second intervals) indicating that the wearing is tight is performed when it is inferred that the wearing is excessively tight, a light emission (for example, repeating lighting for 0.5 seconds at 0.5 second intervals) indicating that the wearing is loose is performed when it is inferred that the wearing is excessively loose, a light emission (for example, repeating lighting for 1 second at 1 second intervals) indicating that the air temperature is low is performed when it is inferred that the air temperature is low, and the like. By emitting light instead of performing voice announcements, the amount of processing of the processor 110 can be reduced, and the user can implement the countermeasure for preventing the reliability decrease by confirming the type of light emission, even when in loud or noisy situations.

When the electronic device 100 does not include the acceleration sensor 132, the processing of step S302 need not be carried out and, in such a case, the notification content to the user in steps S304, S306, S308, S310, S312, and S313 need not include the content suggesting the possibility that large acceleration (exercise) is the cause.

When the electronic device 100 does not include the pressure sensor 133, the processing of steps S303 to S306 need not be carried out.

When the electronic device 100 does not include the temperature sensor 134, the processing of steps S307 and S308 need not be carried out.

When the electronic device 100 does not include the communicator 170 and the position acquirer 180, the processing of steps S309 and S310 need not be carried out.

In the embodiment described above, a description is given in which the electronic device 100 calculates the pulse rate and the reliability of that pulse rate on the basis of the AD value obtained from the output value of the PD, and displays the pulse rate in the output mode corresponding to the reliability of that pulse rate. However, the information output by the electronic device 100 is not limited to the pulse rate. In one example, with the pulse wave sensor 131, it is possible to measure the arterial oxygen saturation (SpO2) using two wavelengths, namely those of infrared light and red light, but the reliability of the arterial oxygen saturation decreases under the same conditions (for example, when the wearing pressure is inappropriate) as the pulse rate. Accordingly, the electronic device 100 can display the arterial oxygen saturation of the user in an output mode corresponding to the reliability of that arterial oxygen saturation, output a reliability decrease prevention countermeasure, and the like.

With the electronic device 100, the sensors of the sensor 130 may be increased or reduced as desired, desired biometric information obtained from the sensor 130 may be displayed in the output mode corresponding to the reliability of that biometric information, a reliability decrease prevention countermeasure may be output, and the like.

The information obtained from the sensor 130 (for example, the AD value obtained from the pulse wave sensor 131), and the pulse rate, the arterial oxygen saturation, and the like calculated on the basis of the information from the sensor 130 are the biometric information, but various information that can be calculated from these pieces of information (for example, stress levels and vascular age) can also be regarded as the biometric information. Moreover, the electronic device 100 may output these optional pieces of biometric information in an output mode corresponding to the reliability of these pieces of biometric information.

In such a case as well, the reliability of this optional biometric information can be calculated on the basis of the reliability of the information (generally, the information from the sensor 130 such as the AD value) used to calculate the reliability of that biometric information and, as such, the electronic device 100 can display the optional biometric information in an output mode corresponding to the reliability of that optional biometric information. Moreover, the reliability of that optional biometric information is dependent on the reliability of the information (for example, the AD value) used to calculate that optional biometric information and, as such, the electronic device 100 can output the reliability decrease prevention countermeasure via the same processing as the countermeasure output processing described above.

The electronic device 100 need not necessarily output the biometric information in the form of displaying on a display. A configuration is possible in which, the electronic device 100 outputs the biometric information, by voice, in an output mode corresponding to the reliability of that biometric information. Examples of the output mode when outputting by voice include the electronic device 100 outputting the biometric information in an unclear voice when the reliability of the biometric information is low, and outputting the biometric information in a clear voice when the reliability is high.

Note that the electronic device 100 can be realized by a wearable computer that can be worn on the body of the user, or a smartphone, a tablet, a PC, or other computer capable of acquiring detection values detected by sensors attached to the body of the user. Specifically, in the embodiment described above, examples are described in which programs, such as the pulse rate display processing, executed by the electronic device 100 are stored in advance in the storage 120. However, a computer may be configured that is capable of executing the various processings described above by storing and distributing the programs on a non-transitory computer-readable recording medium such as a compact disc read-only memory (CD-ROM), a digital versatile disc (DVD), a magneto-optical, disc (MO), a memory card, and a USB memory, and reading out and installing these programs on the computer.

Furthermore, the program can be superimposed on a carrier wave and applied via a communication medium such as the internet. For example, the program may be posted to and distributed via a bulletin board system (BBS) on a communication network. Moreover, a configuration is possible in which the various processings described the above are executed by starting the programs and, under the control of the operating system (OS), executing the programs in the same manner as other applications/programs.

Additionally, a configuration is possible in which the processor 110 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An electronic device, comprising:
    a first outputter; and
    a processor, wherein the processor is configured to:
        acquire biometric information that is information about a living body;
        calculate a reliability of the biometric information based on the acquired biometric information;
        cause the first outputter to display the biometric information by a position of a pointer; and
        output, by a vibration of the pointer, information relating to the calculated reliability to the first outputter.

2. The electronic device according to claim 1, wherein the first outputter the processor is configured to:
    set an amplitude of the vibration of the pointer to a first amplitude value in a case where the calculated reliability is less than a first threshold; and
    set the amplitude of the vibration of the pointer to a second amplitude value in a case where the calculated reliability is greater than or equal to the first threshold.

3. The electronic device according to claim 2, wherein the processor is configured to:
    set the amplitude of the vibration of the pointer to the second amplitude value in a case where the calculated reliability is greater than or equal to the first threshold and less than the second threshold; and
    set the amplitude of the vibration of the pointer to zero in a case where the calculated reliability is greater than or equal to the second threshold.

4. The electronic device according to claim 3, further comprising:
    a second outputter,
    wherein the processor is configured to output information relating to the reliability to the second outputter.

5. The electronic device according to claim 3, wherein the biometric information is a pulse rate.

6. The electronic device according to claim 2, further comprising:
    a second outputter,
    wherein the processor is configured to output information relating to the reliability to the second outputter.

7. The electronic device according to claim 2, wherein the biometric information is a pulse rate.

8. The electronic device according to claim 1, wherein the first outputter displays the biometric information by a character.

9. The electronic device according to claim 8, wherein the processor is configured to display the biometric information on the first outputter by a character for which the at least one attribute among a color, a size, a darkness, and a font of the character is changed based on the calculated reliability.

10. The electronic device according to claim 9, further comprising:
    a second outputter,
    wherein the processor is configured to output information relating to the reliability to the second outputter.

11. The electronic device according to claim 9, wherein the biometric information is a pulse rate.

12. The electronic device according to claim 8, further comprising:
    a second outputter,
    wherein the processor is configured to output information relating to the reliability to the second outputter.

13. The electronic device according to claim 8, wherein the biometric information is a pulse rate.

14. The electronic device according to claim 1, wherein the first outputter displays the biometric information by a graph.

15. The electronic device according to claim 14, wherein the processor is configured to display the biometric information on the first outputter by a graph of a line for which at least one attribute among a line type, a line width, a color, and a darkness of a line of the graph is changed based on the calculated reliability.

16. The electronic device according to claim 14, further comprising:
    a second outputter,
    wherein the processor is configured to output information relating to the reliability to the second outputter.

17. The electronic device according to claim 1, further comprising:
    a second outputter,
    wherein the processor is configured to output information relating to the reliability to the second outputter.

18. The electronic device according to claim 1, wherein the biometric information is a pulse rate.

19. An information output method for an electronic device including a first outputter and a processor, the information output method comprising:
    acquiring, by the processor, biometric information that is information about a living body;
    calculating, by the processor, a reliability of the biometric information based on the acquired biometric information;
    causing, by the processor, the first outputter to display the biometric information by a position of a pointer; and
    outputting, by the processor, by a vibration of the pointer, information relating to the calculated reliability to the first outputter.

20. A non-transitory computer-readable recording medium storing a program, the program causing a computer of an electronic device including a first outputter and a processor to execute the following processing of:

acquiring biometric information that is information about a living body;
calculating a reliability of the biometric information based on the acquired biometric information;
causing the first outputter to display the biometric information by a position of a pointer; and
outputting, by a vibration of the pointer, information relating to the calculated reliability to the first outputter.

* * * * *